(12) United States Patent
Jung et al.

(10) Patent No.: US 12,365,268 B2
(45) Date of Patent: Jul. 22, 2025

(54) SYSTEM FOR IMPROVING STARTABILITY OF FUEL CELL VEHICLE AND CONTROL METHOD THEREOF

(71) Applicants: Hyundai Motor Company, Seoul (KR); Kia Corporation, Seoul (KR)

(72) Inventors: Jae Kwon Jung, Hwaseong-si (KR); Seong Cheol Jeong, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 485 days.

(21) Appl. No.: 17/980,882

(22) Filed: Nov. 4, 2022

(65) Prior Publication Data
US 2023/0406157 A1   Dec. 21, 2023

(30) Foreign Application Priority Data
Jun. 15, 2022   (KR) .................. 10-2022-0073099

(51) Int. Cl.
  *B60L 58/31*  (2019.01)
  *B60L 58/27*  (2019.01)
  (Continued)

(52) U.S. Cl.
  CPC .............. *B60L 58/31* (2019.02); *B60L 58/27* (2019.02); *B60L 58/40* (2019.02);
  (Continued)

(58) Field of Classification Search
  CPC .......... B60L 58/27; B60L 58/31; B60L 58/32; B60L 58/40; B60L 2240/545;
  (Continued)

(56) References Cited

U.S. PATENT DOCUMENTS

| | | | | |
|---|---|---|---|---|
| 2010/0104906 A1* | 4/2010 | Hirakawa | ............... | B60L 58/33 429/432 |
| 2011/0018491 A1* | 1/2011 | Yoshida | .................. | B60L 58/27 320/101 |

(Continued)

FOREIGN PATENT DOCUMENTS

KR   10-1782353 B1   9/2017

OTHER PUBLICATIONS

Howroyd et al. (S. Howroyd, R Chen, Powerpath controller for fuel cell & battery hybridization, International Journal of Hydrogen Energy 41 (2016) 4229-4238) (Year: 2016).*

*Primary Examiner* — Joshua L Allen
(74) *Attorney, Agent, or Firm* — Morgan, Lewis & Bockius LLP (57) ABSTRACT

A startability improving system of a fuel cell vehicle is disclosed. The startability improving system includes a high-voltage battery and a fuel cell connected to a main bus stage of the vehicle, to provide driving energy, and a controller configured to determine whether there is a possibility that operating voltages of the high-voltage battery and the fuel cell overlap each other when the high-voltage battery and the fuel cell are connected to the main bus stage, in response to determination that there is a possibility that the operating voltages of the high-voltage battery and the fuel cell overlap each other, the controller configured to vary the operating voltage of the high-voltage battery or the fuel cell, and then to connect the high-voltage battery and the fuel cell to the main bus stage.

16 Claims, 4 Drawing Sheets

(51) Int. Cl.
    *B60L 58/40*           (2019.01)
    *H01M 8/04302*      (2016.01)
    *H01M 8/04858*      (2016.01)

(52) U.S. Cl.
    CPC ..... *H01M 8/04302* (2016.02); *H01M 8/0488* (2013.01); *B60L 2240/547* (2013.01); *H01M 2250/20* (2013.01)

(58) Field of Classification Search
    CPC ...... B60L 2240/547; B60L 1/00; B60L 58/24; H01M 8/04302; H01M 8/0488; H01M 8/04268; H01M 8/0432; H01M 8/04626; H01M 2250/20; H01M 2220/20; H01M 16/006; H01M 12/04; H01M 12/08; Y02E 60/50; Y02T 90/40; Y02T 10/70; Y02T 10/7072
    See application file for complete search history.

(56) References Cited

U.S. PATENT DOCUMENTS

| | | | |
|---|---|---|---|
| 2014/0255810 A1* | 9/2014 | Lenz ..................... | B60L 50/72 |
| | | | 429/430 |
| 2017/0294666 A1* | 10/2017 | Kim ................. | H01M 8/04298 |
| 2018/0229622 A1* | 8/2018 | Matsumoto .......... | H02M 3/155 |
| 2019/0061556 A1* | 2/2019 | Breu ..................... | B60L 50/66 |
| 2020/0185735 A1* | 6/2020 | Kim ................... | H01M 8/0488 |

* cited by examiner

SYSTEM FOR IMPROVING STARTABILITY OF FUEL CELL VEHICLE AND CONTROL METHOD THEREOF

CROSS-REFERENCE TO RELATED APPLICATION

This application claims the benefit of priority to Korean Patent Application No. 10-2022-0073099, filed on Jun. 15, 2022 in the Korean Intellectual Property Office, the disclosure of which is incorporated herein by reference.

TECHNICAL FIELD

The present disclosure relates to a system for improving startability of a fuel cell vehicle and a control method thereof, and more particularly to a startability improving system of a fuel cell vehicle and a control method thereof which are capable of preventing a voltage reversal phenomenon occurring when operating voltages of a high-voltage battery and a fuel cell overlap each other upon start of the fuel cell vehicle, thereby improving startability of the fuel cell vehicle.

BACKGROUND

A fuel cell is a device configured to receive hydrogen and air, thereby generating electric energy through an electrochemical reaction in an interior of a fuel cell stack and, as such, may be used a power source for motor driving in an eco-friendly vehicle such as a fuel cell electric vehicle (FCEV) or the like.

The fuel cell electric vehicle includes a fuel cell stack in which a plurality of fuel cells used as a power source is stacked, a fuel supply system configured to supply hydrogen, as fuel, to the fuel cell stack, an air supply system configured to supply oxygen as an oxidizing agent required for electrochemical reaction, a heat management system using cooling water, etc. in order to control a temperature of the fuel cell stack, etc.

The fuel supply system reduces a pressure of compressed hydrogen within a hydrogen tank, and then supplies the pressure-reduced hydrogen to an anode (a fuel electrode) of the fuel cell stack, whereas the air supply system operates an air compressor to suck in ambient air, and then supplies the sucked in ambient air to a cathode (an air electrode) of the fuel cell stack.

When hydrogen is supplied to the anode of the fuel cell stack, oxidation of hydrogen is carried out at the anode and, as such, protons and electrons are generated. The generated protons and electrons migrate to the cathode via an electrolyte membrane and a separation plate, respectively. At the cathode, water is produced through electrochemical reaction, in which the protons and electrons migrating from the anode and oxygen in air participate, and electric energy is generated from a flow of the electrons.

Meanwhile, a fuel cell mounted in a fuel cell vehicle exhibits an output voltage of about −1V to +1.2V. Such a fuel cell has an eco-friendly advantage, but encounters a problem in that it is difficult to rapidly supply electric power, corresponding to output variation of a vehicle.

For this reason, generally, fuel cell vehicles additionally use a high-voltage battery in order to cope with output variation of the vehicle as mentioned above.

That is, in the fuel cell vehicle, the fuel cell corresponds to a main power source and, as such, generates electric energy through electrochemical reaction, and provides the electric energy as driving energy of the fuel cell vehicle, whereas the high-voltage battery corresponds to an auxiliary power source and, as such, provides driving energy of the fuel cell vehicle, together with the fuel cell, which is a main power source.

In addition, electric energy generated from the fuel cell is supplied to a load of the vehicle and the high-voltage battery and, as such, serves to drive the load or to recharge the high-voltage battery. The electric energy stored in the high-voltage battery is discharged from the high-voltage battery when the load of the fuel cell vehicle excessively increases (for example, when high power is required) and, as such, supplements driving energy of the fuel cell vehicle.

Meanwhile, improving an output of the fuel cell in the technical field of fuel cells is relevant to a basic subject matter. When the output of the fuel cell is enhanced, the operating voltage range of the fuel cell becomes higher and, as such, a range in which a voltage of the fuel cell and a voltage of the high-voltage battery overlap each other is generated.

The case in which the voltage of the fuel cell and the voltage of the high-voltage battery overlap each other means the case in which the voltage of the fuel cell is higher than the voltage of the high-voltage battery. When the fuel cell vehicle is started in such a situation, voltage reversal occurs and, as such, current is forcibly withdrawn from the fuel cell to the high-voltage battery. As a result, degradation of the fuel cell, etc. may be generated and, as such, durability of the fuel cell may be degraded.

Although the above-mentioned problem may be avoided by varying the operating voltage range of the high-voltage battery to be higher than the operating voltage range of the fuel cell, the operating voltage range of the high-voltage battery influences the capacity and performance of the high-voltage battery, etc. and, as such, there is a difficulty in designing a high-voltage battery system.

That is, it is necessary to increase the capacity of the high-voltage battery in order to raise the operating voltage range of the high-voltage battery. In this case, however, the weight and costs of the high-voltage battery are increased.

To this end, in conventional cases, operating voltage ranges of the fuel cell and the high-voltage battery are controlled not to overlap each other in electric power distribution of the entire system through application of an optimum operating voltage range of each of the fuel cell and the high-voltage battery in a stage of designing a system of the fuel cell and the high-voltage battery.

In spite of such control, however, in a vehicle to which a high-power fuel cell is applied, a voltage of the fuel cell and a voltage of the high-voltage battery still overlap each other and, as such, a voltage reversal phenomenon may occur.

In particular, when start of the vehicle is carried out in a state in which ambient temperature of the vehicle is low, as in winter (hereinafter referred to as "cold start"), the above-mentioned voltage reversal phenomenon may more frequently occur due to low-temperature characteristics of the fuel cell and the high-voltage battery. Details as to a voltage reversal phenomenon occurring upon cold start of a fuel cell vehicle are disclosed in a related art.

Therefore, there is an urgent need for a technology capable of fundamentally eliminating a voltage reversal phenomenon occurring due to overlap of operating voltages of a high-voltage battery and a fuel cell.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure has been made in view of the above problems, and it is an object of the present disclosure to provide a startability improving system of a fuel cell vehicle and a control method thereof which are capable of preventing a voltage reversal phenomenon occurring when operating voltages of a high-voltage battery and a fuel cell overlap each other upon start of the fuel cell vehicle, thereby improving startability of the fuel cell vehicle.

In accordance with an aspect of the present disclosure, the above and other objects can be accomplished by the provision of a startability improving system of a fuel cell vehicle including a high-voltage battery and a fuel cell connected to a main bus stage of the fuel cell vehicle, to provide driving energy, and a controller configured to determine whether there is a possibility that operating voltages of the high-voltage battery and the fuel cell overlap each other when the high-voltage battery and the fuel cell are connected to the main bus stage, in response to determination that there is a possibility that the operating voltages of the high-voltage battery and the fuel cell overlap each other, the controller configured to vary the operating voltage of the high-voltage battery or the fuel cell, and then to connect the high-voltage battery and the fuel cell to the main bus stage.

The controller may compare an output voltage of the high-voltage battery upon start of the vehicle with an expected voltage of the fuel cell derived based on a previously-prepared first data map, thereby determining whether there is a possibility that the operating voltages of the high-voltage battery and the fuel cell overlap each other. The first data map may includes a temperature of the fuel cell as an input thereof and the expected voltage as an output thereof.

The controller may compare a charge amount of the high-voltage battery upon start of the vehicle with a required charge amount of the high-voltage battery derived based on a previously-prepared second data map, thereby determining whether there is a possibility that the operating voltages of the high-voltage battery and the fuel cell overlap each other. The second data map may includes a temperature of the high-voltage battery as an input thereof and the required charge amount as an output thereof.

In response to determination that there is a possibility that the operating voltages of the high-voltage battery and the fuel cell overlap each other, the controller may control a temperature of the high-voltage battery or the fuel cell to vary the operating voltage of the high-voltage battery or the fuel cell.

The controller may determine whether temperature control for the high-voltage battery is possible, based on a charge amount of the high-voltage battery, and in response to determination that the temperature control for the high-voltage battery is possible, the controller may perform temperature increase control for the high-voltage battery to raise the operating voltage of the high-voltage battery.

The startability improving system may further include a heater for the high-voltage battery configured to increase a temperature of the high-voltage battery using cooling water. The controller may drive the heater for the high-voltage battery through the high-voltage battery, to perform the temperature increase control for the high-voltage battery.

The controller may determine whether the temperature control for the high-voltage battery is possible, based on an available electric power amount according to the charge amount of the high-voltage battery and a heat capacity required for temperature increase of the high-voltage battery.

The controller may derive the heat capacity required for temperature increase of the high-voltage battery, based on the following Expression:

Heat Capacity Required for Temperature Increase of High-Voltage Battery=(Target Heat Capacity of High-Voltage Battery−Current Heat Capacity of High-Voltage Battery)/Temperature Increase Efficiency of High-Voltage Battery.　　[Expression]

The controller may periodically derive the heat capacity required for temperature increase of the high-voltage battery during the temperature increase control for the high-voltage battery, and may compare the periodically-derived heat capacity required for temperature increase of the high-voltage battery with the available electric power amount according to the charge amount of the high-voltage battery, thereby determining whether the temperature control for the high-voltage battery is possible.

The controller may determine whether temperature control for the high-voltage battery is possible, based on a charge amount of the high-voltage battery, and in response to determination that the temperature control for the high-voltage battery is possible, the controller may perform temperature increase control for the fuel cell to lower the operating voltage of the fuel cell.

The startability improving system may further include a fuel cell main relay, provided between the main bus stage of the vehicle and the fuel cell, configured to connect or disconnect the fuel cell to or from the main bus stage, and a cathode oxygen depletion (COD) heater, provided between the fuel cell main relay and the fuel cell, configured to remove residual oxygen and hydrogen in an interior of the fuel cell. The controller may drive the COD heater through the fuel cell in a state of disconnecting the fuel cell and the main bus stage by controlling the fuel cell main relay, thereby performing the temperature increase control for the fuel cell.

The controller may control the fuel cell main relay to connect the fuel cell to the main bus stage when the operating voltage of the fuel cell is lowered below a predetermined reference value through the temperature increase control for the fuel cell.

In accordance with another aspect of the present disclosure, there is provided a control method of the startability improving system of the fuel cell vehicle comprising a high-voltage battery, a fuel cell and a controller, the method including determining, by the controller, whether there is a possibility that operating voltages of the high-voltage battery and the fuel cell overlap when the high-voltage battery and the fuel cell are connected to the main bus stage, in response to determination that there is a possibility that the operating voltages of the high-voltage battery and the fuel cell overlap, varying, by the controller, the operating voltage of the high-voltage battery or the fuel cell, and connecting, by the controller, the high-voltage battery and the fuel cell to the main bus stage.

The determining comprises: comparing, by the controller, an output voltage of the fuel cell upon start of the vehicle with an expected voltage of the fuel cell derived based on a previously-prepared first data map and comparing, by the controller, a charge amount of the high-voltage battery upon start of the vehicle with a required charge amount of the high-voltage battery derived based on a previously-prepared second data map, the first data map includes a temperature of the fuel cell as an input thereof and the expected voltage of the fuel cell as an output thereof, and the second data map includes a temperature of the high-voltage battery as an input thereof and the required charge amount of the high-voltage battery as an output thereof.

The varying comprises: controlling, by the controller, a temperature of the high-voltage battery or the fuel cell.

The control method comprises: in response to determination that there is no possibility that the operating voltages of the high-voltage battery and the fuel cell overlap,
  connecting, by the controller, the high-voltage battery and the fuel cell to the main bus stage without varying the operating voltage of the high-voltage battery or the fuel cell.

In accordance with the startability improving system of the fuel cell vehicle and the control method thereof according to the exemplary embodiments of the present disclosure, the following effects may be provided.

First, it may be possible to previously determine whether or not there is a possibility of overlap of operating voltages of a high-voltage battery and a fuel cell, based on the operating voltage of the high-voltage battery or a charge amount of the high-voltage battery upon start of the fuel cell vehicle.

Second, it may be possible to avoid a situation in which the operating voltages of the high-voltage battery and the fuel cell overlap each other, through temperature increase control for the high-voltage battery or the fuel cell, when overlap of the operating voltages of the high-voltage battery and the fuel cell is expected. Accordingly, it may be possible to solve problems of weight increase and cost increase caused by an increase in capacity of the high-voltage battery in implementation of conventional avoidance control.

Third, it may be possible to fundamentally eliminate a voltage reversal phenomenon by preventing a situation in which operating voltages of the high-voltage battery and the fuel cell overlap each other, through an avoidance control as described above. Accordingly, there is an effect of enhancing durability of the fuel cell while improving startability of the fuel cell vehicle.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It should be understood that, throughout the specification, "comprising", "including" or the like is intended to express the existence of characteristics, numerals, steps, operations, constituent elements, parts, or the combination thereof, and does not exclude another characteristics, numeral, step, operation, element, part, or any combination thereof, or any addition thereto.

It will be understood that, although the terms "first," "second," etc. may be used herein to describe various elements, these elements should not be limited by these terms. These terms are only used to distinguish one element from another.

In the following description, when a detailed description of well-known functions or configurations related to this document is determined to unnecessarily cloud a gist of the inventive concept, the detailed description thereof will be omitted. In addition, the present disclosure will be described below through a detailed description of specific embodiments illustrated in the accompanying drawings. The detailed description is not intended to limit the present disclosure and it should be understood that the present disclosure includes all changes, equivalents, or substitutions within the spirit and scope of the present disclosure.

A controller 300 according to an exemplary embodiment of the present disclosure may include a communication device configured to communicate with another controller 300 or a sensor, for control of a function controlled by the controller 300 in charge, a memory configured to store an operating system, a logic command, input/output information, etc., and one or more processors configured to execute estimation, operation and determination required for control of the function.

The controller 300 of the startability improving system according to an exemplary embodiment of the present disclosure may be a hardware device implemented by various electronic circuits (e.g., computer, microprocessor, CPU, ASIC, circuitry, logic circuits, etc.). The controller 300 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the controller 300 may be implemented as separate semiconductor circuits. Alternatively, the memory and the controller 300 may be implemented as a single integrated semiconductor circuit. The controller 300 may embody one or more processor(s).

Hereinafter, configurations and principles of actions according to various exemplary embodiments of the present disclosure will be described in detail with reference to the accompanying drawings. Wherever possible, the same reference numbers will be used throughout the drawings to refer to the same or like parts, and overlapping descriptions thereof will be omitted.

Figure 1:
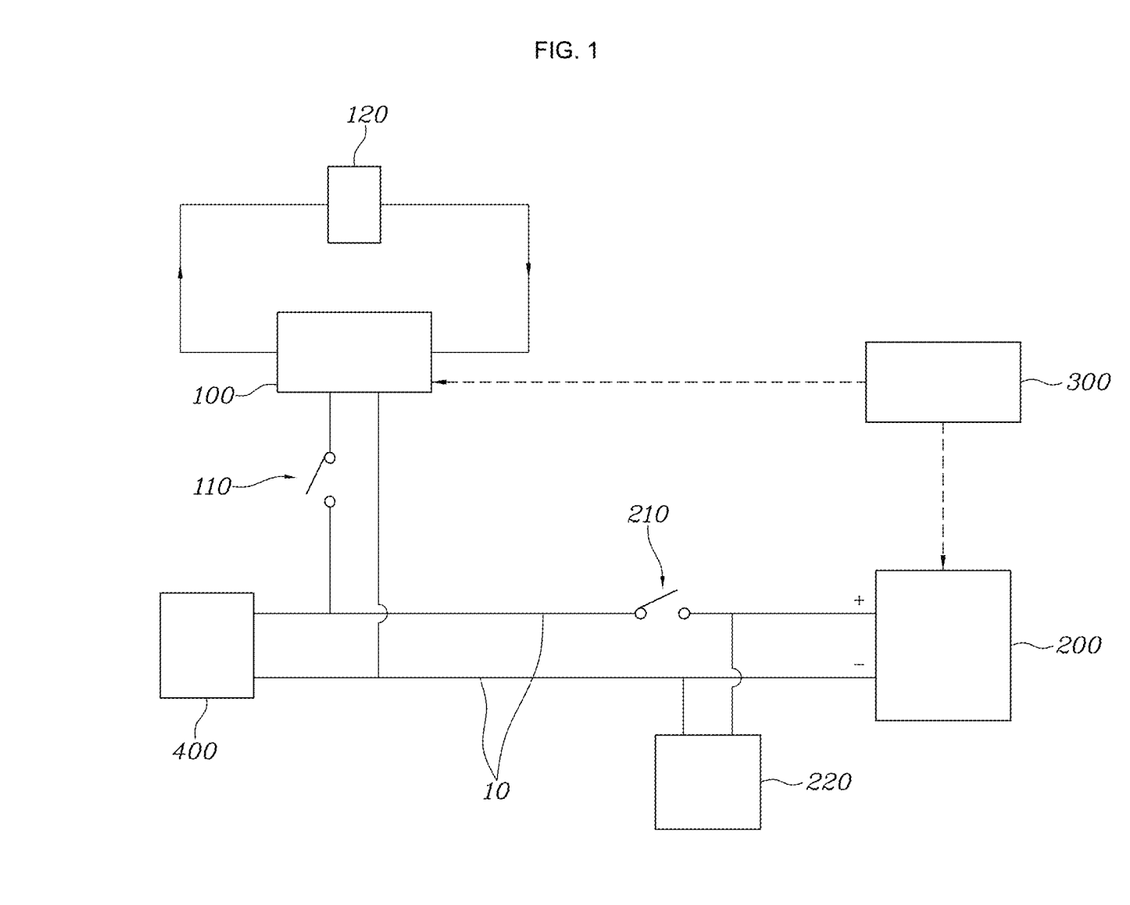
FIG. 1 is a diagram illustrating a startability improving system of a fuel cell vehicle according to an exemplary embodiment of the present disclosure.
Figure 2:
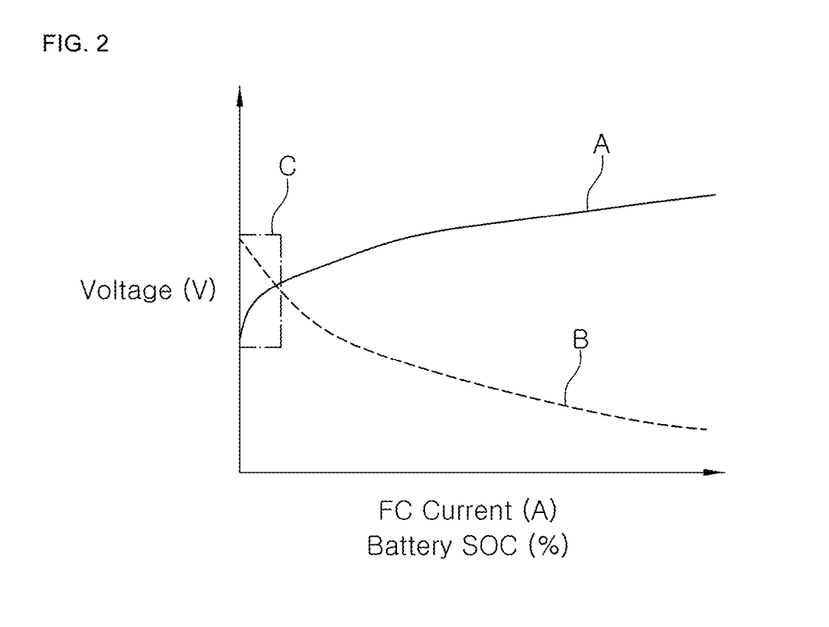
FIG. 2 is a graph depicting a voltage-current trend curve of a fuel cell and a voltage-charge amount trend curve of a high-voltage battery.
Figure 3:
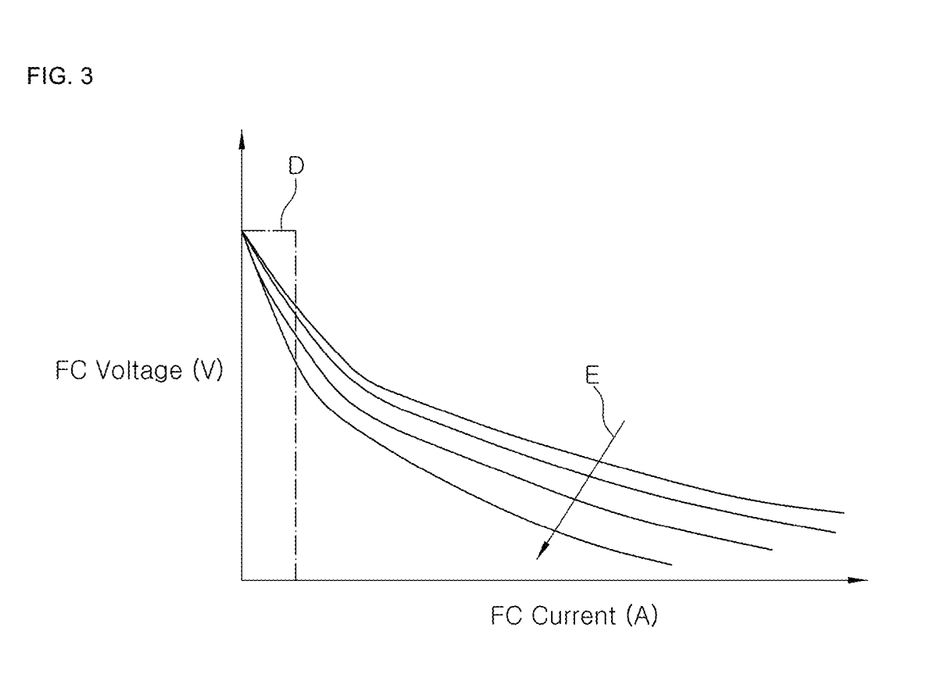
FIG. 3 is a graph depicting a voltage-current trend curve of the fuel cell according to a variation in temperature.
Figure 4:
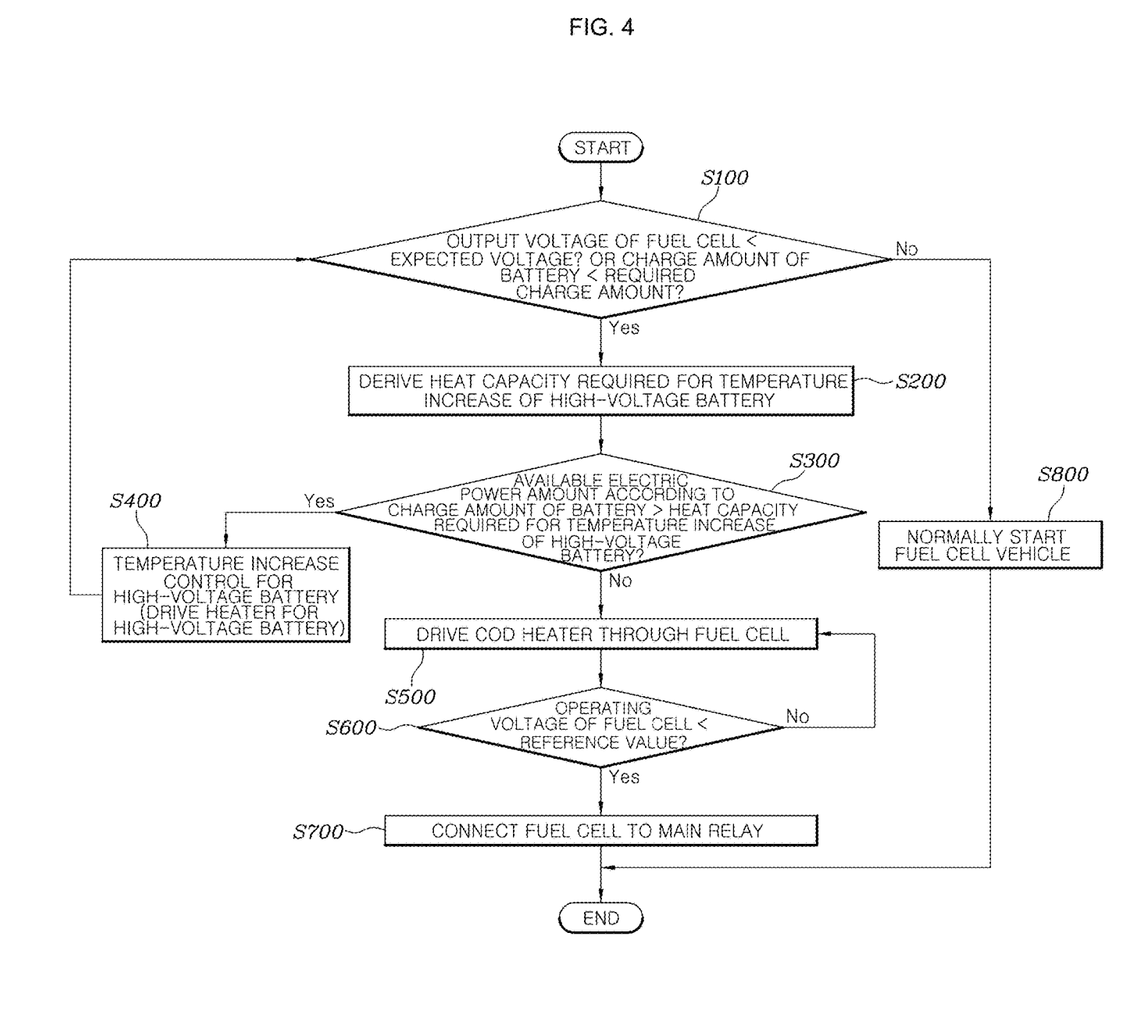
FIG. 4 is a flowchart of a control method of a startability improving system of a fuel cell vehicle according to an exemplary embodiment of the present disclosure.

FIG. 1 is a diagram illustrating a startability improving system of a fuel cell vehicle according to an exemplary embodiment of the present disclosure. FIG. 2 is a graph depicting a voltage-current trend curve of a fuel cell 200 and a voltage-charge amount trend curve of a high-voltage battery 100. FIG. 3 is a graph depicting a voltage-current trend curve of the fuel cell 200 according to a variation in temperature. FIG. 4 is a flowchart of a control method of a startability improving system of a fuel cell vehicle according to an exemplary embodiment of the present disclosure.

Referring to FIG. 1, the startability improving system of the fuel cell vehicle according to the exemplary embodiment of the present disclosure includes a high-voltage battery 100 and a fuel cell 200, which are connected to a main bus stage 10 of the vehicle, thereby providing driving energy, and a controller 300 configured to determine whether or not there is a possibility that operating voltages of the high-voltage battery 100 and the fuel cell 200 overlap each other when the high-voltage battery 100 and the fuel cell 200 are connected to the main bus stage 10, to vary the operating voltage of the high-voltage battery 100 or the fuel cell 200 when overlap of the operating voltages of the high-voltage battery 100 and the fuel cell 200 is expected, and then to connect the high-voltage battery 100 and the fuel cell 200 to the main bus stage 10.

In the startability improving system of the fuel cell vehicle according to the exemplary embodiment of the present disclosure, the "charge amount of the high-voltage battery 100" means a value obtained by dividing the total battery capacity by the currently-usable battery capacity and then converting into percentage (%), and is generally expressed as a "state of charge (SOC)". When the charge amount of the battery is 100%, this means a completely recharged state of the battery, whereas, when the charge amount of the battery is 0%, this means a completely consumed state of the battery.

As mentioned in the Background of the Disclosure, the fuel cell vehicle may use both the fuel cell 200 and the high-voltage battery 100 as a main power source an auxiliary power source, respectively.

That is, in the startability improving system of the fuel cell vehicle according to the exemplary embodiment of the present disclosure, the high-voltage battery 100 may provide driving energy of the fuel cell vehicle, together with the fuel cell 200 as the main power source, and the fuel cell 200 may generate electric energy through electrochemical reaction, and may then provide the electric energy as driving energy of the fuel cell vehicle or recharge the high-voltage battery 100 with the electric energy.

In this case, the high-voltage battery 100 and the fuel cell 200 may be provided to be connected to the main bus stage 10 of the vehicle in order to provide driving energy of the vehicle. In more detail, as shown in FIG. 1, the high-voltage battery 100 and the fuel cell 200 are provided with a battery main relay 110 and a fuel cell main relay 210, respectively, and, as such, may be connected to or disconnected from the main bus stage 10 through the main relays 110 and 210.

When both the high-voltage battery 100 and the fuel cell 200 are connected to the main bus stage 10 through respective main relays 110 and 210, a state in which electric power can be supplied to a load 400 of the vehicle may be established. Accordingly, it may be understood that, when both the high-voltage battery 100 and the fuel cell 200 are connected to the main bus stage 10, this means that start of the fuel cell vehicle is completed.

Meanwhile, enhancing an output of the fuel cell 200 providing driving energy of the vehicle is a basic subject matter in the fuel cell vehicle. When the output of the fuel cell 200 is enhanced, the operating voltage range of the fuel cell 200 becomes higher. As a result, a range in which the operating voltage of the fuel cell 200 and the operating voltage of the high-voltage battery 100 overlap each other is generated.

When the voltage of the fuel cell 200 and the voltage of the high-voltage battery 100 overlap each other, this means the case in which the voltage of the fuel cell 200 is higher than the voltage of the high-voltage battery 100. When start of the fuel cell vehicle is carried out in such a situation, voltage reversal occurs and, as such, current is forcibly withdrawn from the fuel cell 200 to the high-voltage battery 100. As a result, there may be a problem in that degradation of the fuel cell 200, etc. may be generated and, as such, durability of the fuel cell 200 may be degraded.

In particular, the above-described voltage reversal is more frequently generated due to low-temperature characteristics of the fuel cell 200 and the high-voltage battery 100 upon cold start of the fuel cell vehicle. This will be described in more detail with reference to FIG. 3.

FIG. 3 is a graph depicting a voltage-current trend curve of the fuel cell 200 according to temperature variation. In FIG. 3, a region D means an operating current region of the fuel cell 200 upon start of the fuel cell 200, and extension in a direction E means a lower temperature state.

That is, at a lower temperature, the voltage-current curve of the fuel cell 200 extends downwards. In particular, upon cold start of the fuel cell vehicle, supply of air is interfered with residual moisture or ice (in the case in which residual moisture is frozen) and, as such, the fuel cell 200 may operate in a low current range such as the region D. As start of the fuel cell vehicle is carried out in the low current range, as described above, the operating voltage of the fuel cell 200 becomes relatively higher.

Next, a situation in which operating voltages of the high-voltage battery 100 and the fuel cell 200 overlap each other will be described with reference to FIG. 2.

FIG. 2 is graphs respectively depicting a voltage-charge amount trend curve of the high-voltage battery 100 and a voltage-current trend curve of the fuel cell 200. In FIG. 2, a curve A is a curve depicting a voltage-charge amount trend of the high-voltage battery 100, a curve B is a curve depicting a voltage-current trend of the fuel cell 200, and a region C means a range in which operating voltages of the high-voltage battery 100 and the fuel cell 200 overlap each other.

That is, with reference to the curve A, a y-axis thereof represents an operating voltage of the high-voltage battery 100, and an x-axis thereof represents a charge amount of the high-voltage battery 100. On the other hand, with reference to the curve B, a y-axis thereof represents an operating voltage of the fuel cell 200, and an x-axis thereof represents operating current of the fuel cell 200.

As described above, upon cold start of the fuel cell vehicle, the operating voltage of the fuel cell 200 becomes relatively higher. On the other hand, the charge amount of the high-voltage battery 100 exhibits characteristics that the lower the temperature, the smaller the charge amount. For this reason, as shown in FIG. 2, start of the vehicle is carried out in a range in which the charge amount of the high-voltage battery 100 is small and, as such, the operating voltage of the high-voltage battery 100 becomes relatively lower.

Accordingly, a range in which operating voltages of the high-voltage battery 100 and the fuel cell 200 overlap each other may be generated, as the region C.

To this end, the purpose of the startability improving system of the fuel cell vehicle according to the exemplary embodiment of the present disclosure is to avoid a situation in which operating voltages of the high-voltage battery 100 and the fuel cell 200 overlap each other by determining whether or not there is a possibility that the operating voltages of the high-voltage battery 100 and the fuel cell 200 overlap each other, varying the operating voltage of the high-voltage battery 100 or the fuel cell 200 when overlap of the operating voltages of the high-voltage battery 100 and the fuel cell 200 is expected, and then connecting the high-voltage battery 100 and the fuel cell 200 to the main bus stage 10.

For reference, it is understood that "varying the operating voltage of the high-voltage battery 100 or the fuel cell 200" means raising the operating voltage of the high-voltage battery 100 or lowering the operating voltage of the fuel cell 200. This will be described later.

Thus, a voltage reversal phenomenon may be fundamentally eliminated by preventing a situation in which operating voltages of the high-voltage battery 100 and the fuel cell 200 overlap each other, through variation of the operating voltage of the high-voltage battery 100 or the fuel cell 200. In addition, there is an advantage in that it may be possible to eliminate a problem that weight and costs are increased when the capacity of the high-voltage battery 100 is increased in order to avoid overlap of the operating voltages of the high-voltage battery 100 and the fuel cell 200, in conventional cases.

Meanwhile, the startability improving system of the fuel cell vehicle according to the exemplary embodiment of the present disclosure may previously determine whether or not there is a possibility of overlap of operating voltages of the high-voltage battery 100 and the fuel cell 200, based on an "operating voltage of the high-voltage battery 100" and a "charge amount of the high-voltage battery 100" upon start of the fuel cell vehicle. Hereinafter, concrete principles of actions of the above-described determination will be described.

First, the controller 300 of the startability improving system of the fuel cell vehicle according to the exemplary embodiment of the present disclosure may compare an operating voltage of the high-voltage battery 100 upon start of the vehicle with an expected voltage of the fuel cell 200 derived based on a previously-prepared first data map, and may then determine whether or not there is a possibility of overlap of the operating voltage of the high-voltage battery 100 with an operating voltage of the fuel cell 200, based on the results of the comparison. The first data map may use a temperature of the fuel cell 200 as an input thereof and an expected voltage as an output thereof.

As previously described with reference to FIG. 3, the fuel cell 200 may operate in a low current range such as the region D in FIG. 3 in accordance with a temperature condition.

Accordingly, it may be possible to determine whether or not there is a possibility of overlap of the operating voltages of the high-voltage battery 100 and the fuel cell 200 by comparing the expected voltage of the fuel cell 200 and the operating voltage of the high-voltage battery 100 upon start of the vehicle with each other.

In detail, when the expected voltage of the fuel cell 200 upon start of the vehicle is lower than the operating voltage of the high-voltage battery 100 upon start of the vehicle, it may be possible to determine that overlap of the operating voltages of the high-voltage battery 100 and the fuel cell 200 is expected.

Conversely, when the expected voltage of the fuel cell 200 upon start of the vehicle is higher than the operating voltage of the high-voltage battery 100 upon start of the vehicle, it may be possible to determine that overlap of the operating voltages of the high-voltage battery 100 and the fuel cell 200 is not expected.

In this case, the expected voltage of the fuel cell 200 may be derived based on the previously-prepared first data map. The first data map may be constituted by experimental values derived through a plurality of experiments, as expected voltages according to temperatures of the fuel cell 200. The first data map as described above may be stored in a memory (not shown) internally included in the controller 300.

That is, the controller 300 derives an expected voltage of the fuel cell 200 upon start of the vehicle with reference to a current temperature of the fuel cell 200, based on the first data map. The controller 300 then compares the derived expected voltage with the operating voltage of the high-voltage battery 100, thereby determining whether or not there is a possibility that the operating voltages of the high-voltage battery 100 and the fuel-cell 200 overlap each other.

Accordingly, it may be possible to previously determine whether or not there is a possibility of overlap of the operating voltages of the high-voltage battery 100 and the fuel cell 200, before completion of the start of the vehicle, and, as such, there is an effect of fundamentally preventing a situation of overlap of the operating voltages of the high-voltage battery 100 and the fuel cell 200 by performing appropriate control in accordance with the results of the determination.

In addition, the controller 300 of the startability improving system of the fuel cell vehicle according to the exemplary embodiment of the present disclosure may compare a charge amount of the high-voltage battery 100 upon start of the vehicle with a required charge amount of the high-voltage battery 100 derived based on a previously-prepared second data map, and may then determine whether or not there is a possibility of overlap of an operating voltage of the high-voltage battery 100 with an operating voltage of the fuel cell 200, based on the results of the comparison. The second data map may use a temperature of the high-voltage battery 100 as an input thereof and a required charge amount as an output thereof.

As previously described with reference to FIG. 2, the charge amount of the high-voltage battery 100 has characteristics that the lower the temperature, the smaller the charge amount. For this reason, start of the vehicle is carried out in a range in which the charge amount of the high-voltage battery 100 is small and, as such, the operating voltage of the high-voltage battery 100 is relatively low.

Accordingly, it may be possible to determine whether or not there is a possibility of overlap of the operating voltages of the high-voltage battery 100 and the fuel cell 200 in accordance with whether or not the charge amount of the high-voltage battery 100 upon start of the vehicle corresponds to a startable level while preventing overlap of the operating voltages of the high-voltage battery 100 and the fuel cell 200.

Here, it is understood that the "startable level while preventing overlap of the operating voltages of the high-voltage battery 100 and the fuel cell 200" means a required charge amount of the high-voltage battery 100 satisfying a required output targeted at the current temperature and the operating voltage of the high-voltage battery 100.

That is, it may be possible to determine whether or not there is a possibility of overlap of the operating voltages of the high-voltage battery 100 and the fuel cell 200 by comparing the charge amount of the high-voltage battery 100 and the required charge amount with each other.

In detail, when the charge amount of the high-voltage battery 100 upon start of the vehicle is lower than the required charge amount, it may be possible to determine that overlap of the operating voltages of the high-voltage battery 100 and the fuel cell 200 is expected.

Conversely, when the charge amount of the high-voltage battery 100 upon start of the vehicle is higher than the required charge amount, it may be possible to determine that overlap of the operating voltages of the high-voltage battery 100 and the fuel cell 200 is not expected.

In this case, the required charge amount of the high-voltage battery 100 may be derived based on the previously-prepared second data map. The second data map may be constituted by experimental values derived through a plurality of experiments, as required charge amounts according to temperatures of the high-voltage battery 100. The second data map as described above may be stored in the memory (not shown) internally included in the controller 300.

That is, the controller 300 derives a required charge amount of the high-voltage battery 100 with reference to a current temperature of the high-voltage battery 100, based on the second data map. The controller 300 then compares the derived required charge amount of the high-voltage battery 100 with the charge amount of the high-voltage battery 100, thereby determining whether or not there is a possibility that the operating voltages of the high-voltage battery 100 and the fuel-cell 200 overlap each other.

Accordingly, it may be possible to previously determine whether or not there is a possibility of overlap of the operating voltages of the high-voltage battery 100 and the fuel cell 200, before completion of the start of the vehicle, and, as such, there is an effect of fundamentally preventing a situation of overlap of the operating voltages of the high-voltage battery 100 and the fuel cell 200 by performing appropriate control in accordance with the results of the determination.

In addition, the situation in which the charge amount of the high-voltage battery 100 is low may occur not only upon cold start of the fuel cell vehicle, but also even in the case in which normal start is performed, in accordance with situations. In this regard, there is an advantage in that whether or not there is a voltage overlap possibility of the high-voltage battery 100 and the fuel cell 200 unexpectedly occurring in various start situations may be previously determined.

Next, the case in which the controller 300 according to the exemplary embodiment of the present disclosure "varies the operating voltage of the high-voltage battery 100 or the fuel cell 200" will be described.

When operating voltage overlap of the high-voltage battery 100 and the fuel cell 200 is expected, the controller 300 of the startability improving system of the fuel cell vehicle according to the exemplary embodiment of the present disclosure may vary the operating voltage of the high-voltage battery 100 or the fuel cell 200 by controlling the temperature of the high-voltage battery 100 or the fuel cell 200.

As previously described with reference to FIGS. 2 and 3, the operating voltages of the high-voltage battery 100 and the fuel cell 200 have characteristics that the operating voltages vary in accordance with temperature. To this end, the controller 300 of the startability improving system of the fuel cell vehicle according to the exemplary embodiment of the present disclosure varies respective operating voltages of the high-voltage battery 100 and the fuel cell 200 by controlling temperatures of the high-voltage battery 100 and the fuel cell 200, in order to prevent a situation in which the operating voltages of the high-voltage battery 100 and the fuel cell 200 overlap each other.

In detail, when the temperature of the high-voltage battery 100 increases, the operating voltage of the high-voltage battery 100 is increased and, as such, may escape the region C of FIG. 2.

In addition, when the temperature of the fuel cell 200 increases, an output of the fuel cell 200 may be recovered as residual moisture and ice present in an interior of the fuel cell 200, which interfere with a flow of air supplied to the fuel cell 200 in a low temperature condition, are evaporated and melted, respectively, and, as such, the output of the fuel cell 200 may escape a low current range such as the region D of FIG. 3.

In other words, the controller 300 of the startability improving system of the fuel cell vehicle according to the exemplary embodiment of the present disclosure may perform temperature increase control for the high-voltage battery 100 or the fuel cell 200 such that the operating voltage of the high-voltage battery 100 is raised or the operating voltage of the fuel cell 200 is lowered, when operating voltage overlap of the high-voltage battery 100 and the fuel cell 200 is expected.

That is, the controller 300 of the startability improving system of the fuel cell vehicle according to the exemplary embodiment of the present disclosure may perform "temperature increase control for the high-voltage battery 100 to raise the operating voltage of the high-voltage battery 100" or may perform "temperature increase control for the fuel cell 200 to lower the operating voltage of the fuel cell 200".

Hereinafter, the case of "temperature increase control for the high-voltage battery 100 to raise the operating voltage of the high-voltage battery 100" will be first described.

The controller 300 of the startability improving system of the fuel cell vehicle according to the exemplary embodiment of the present disclosure may determine whether or not temperature control for the high-voltage battery 100 is possible, based on the charge amount of the high-voltage battery 100, and may then perform temperature increase control for the high-voltage battery 100 in order to raise the operating voltage of the high-voltage battery 100 upon determining that temperature control for the high-voltage battery 100 is possible.

In detail, the startability improving system of the fuel cell vehicle according to the exemplary embodiment of the present disclosure may further include a heater 120 for the high-voltage battery (hereinafter referred to as a "high-voltage battery heater 120") configured to increase the temperature of the high-voltage battery 100 using cooling water. The controller 300 may perform temperature increase control for the high-voltage battery 100 by driving the high-voltage battery heater 120 through the high-voltage battery 100.

Generally, in a fuel cell vehicle in which the high-voltage battery 100 is mounted, a separate system or device for controlling a temperature of the high-voltage battery 100 is provided. Such a temperature control system for the high-voltage battery 100 is configured by including the high-voltage battery 100, the high-voltage battery heater 120, etc.

In FIG. 1, the high-voltage battery 100 and the high-voltage battery heater 120 are shown, and the high-voltage battery heater 120 may be provided at a flow path, through which cooling water flows, and may increase a temperature of the high-voltage battery 100 by the cooling water.

In the exemplary embodiment of the present disclosure, temperature increase control for the high-voltage battery 100 is performed before completion of start of the fuel cell vehicle and, as such, it is impossible to drive the high-voltage battery heater 120 through electricity generation of the fuel cell 200.

To this end, in the startability improving system of the fuel cell vehicle according to the exemplary embodiment of the present disclosure, the high-voltage battery heater 120 is driven through discharge of the high-voltage battery 100. Accordingly, the controller 300 of the startability improving system of the fuel cell vehicle according to the exemplary embodiment of the present disclosure determines whether or not temperature control for the high-voltage battery 100 is possible, based on the charge amount of the high-voltage battery 100.

That is, the controller 300 according to the exemplary embodiment of the present disclosure may perform temperature increase control for the high-voltage battery 100 by determining whether or not the charge amount of the high-voltage battery 100 corresponds to a level sufficient to drive the high-voltage battery heater 120, determines that temperature control for the high-voltage battery 100 is possible, upon determining that the high-voltage battery heater 120 can be driven, and then driving the high-voltage battery heater 120 such that an operating voltage of the high-voltage battery 100 is raised.

As a result, the operating voltage of the high-voltage battery 100 escapes the region C of FIG. 2 in accordance with rising thereof and, as such, there is an effect of preventing a situation in which the operating voltage of the high-voltage battery 100 overlaps with the operating voltage of the fuel cell 200.

Meanwhile, concrete principles of actions for determination of whether or not temperature control for the high-voltage battery 100 is possible, based on the charge amount of the high-voltage battery 100 in the startability improving system of the fuel cell vehicle according to the exemplary embodiment of the present disclosure, will be described hereinafter.

The controller 300 of the startability improving system of the fuel cell vehicle according to the exemplary embodiment of the present disclosure may determine whether or not temperature control for the high-voltage battery 100 is possible, based on an available electric power amount according to a charge amount of the high-voltage battery 100 and a heat capacity required for temperature increase of the high-voltage battery 100.

In this case, the controller 300 of the startability improving system of the fuel cell vehicle according to the exemplary embodiment of the present disclosure may derive a heat capacity required for temperature increase of the high-voltage battery 100, based on the following Expression:

Heat Capacity Required for Temperature Increase of High-Voltage Battery=(Target Heat Capacity of High-Voltage Battery−Current Heat Capacity of High-Voltage Battery)/Temperature Increase Efficiency of High-Voltage Battery.   [Expression]

As described above, the stability improving system of the fuel cell vehicle according to the exemplary embodiment of the present disclosure raises the operating voltage of the high-voltage battery 100 by driving the high-voltage battery heater 120 through discharge of the high-voltage battery 100, thereby increasing the temperature of the high-voltage battery 100.

That is, it is necessary to determine whether or not the charge amount of the high-voltage battery 100 corresponds to a level sufficient to drive the high-voltage battery heater 120. This may be achieved by comparing "an available electric power amount according to the charge amount of the high-voltage battery 100" and "electric power consumption required for driving of the high-voltage battery heater 120" with each other.

Here, it is sufficient for the high-voltage battery heater 120 to be driven only to a level required to increase the temperature of the high-voltage battery 100 to an appropriate temperature and, as such, the "electric power consumption required for driving of the high-voltage battery heater 120" may be expressed as a "heat capacity required for temperature increase of the high-voltage battery 100".

In addition, the "heat capacity required for temperature increase of the high-voltage battery 100" may be calculated by dividing, by temperature increase efficiency of the high-voltage battery 100, a value obtained by deducting the current heat capacity of the high-voltage battery 100 from a target heat capacity of the high-voltage battery 100, as expressed by the above Expression.

Here, it may be understood that the target heat capacity of the high-voltage battery 100 means a heat capacity at a target temperature of the high-voltage battery 100, and the current heat capacity of the high-voltage battery 100 means a heat capacity at the current temperature of the high-voltage battery 100.

In addition, the temperature increase efficiency of the high-voltage battery 100 is an experimental value derived through a plurality of experiments, and may be stored in the memory (not shown) internally included in the controller 300.

That is, the controller 300 according to the exemplary embodiment of the present disclosure may determine that temperature control for the high-voltage battery 100 is possible, when the available electric power amount according to the charge amount of the high-voltage battery 100 is greater than the heat capacity required for temperature increase of the high-voltage battery 100, and, as such, may then perform temperature increase control for the high-voltage battery 100 in order to raise the operating voltage of the high-voltage battery 100.

Meanwhile, the controller 300 of the startability improving system according to the exemplary embodiment of the present disclosure may periodically derive a heat capacity required for temperature increase of the high-voltage battery 100 during temperature increase control for the high-voltage battery 100, and may then compare the periodically-derived heat capacity required for temperature increase of the high-voltage battery 100 with the available electric power amount according to the charge amount of the high-voltage battery 100, thereby determining whether or not temperature control for the high-voltage battery 100 is possible.

The startability improving system of the fuel cell vehicle according to the exemplary embodiment of the present disclosure controls the high-voltage battery heater 120 to be driven through discharge of the high-voltage battery 100 such that the temperature of the high-voltage battery 100 is increased, thereby raising the operating voltage of the high-voltage battery 100.

In this case, when the discharge speed of the high-voltage battery 100 is higher than the operating voltage rising speed of the high-voltage battery 100, only the electric power of the high-voltage battery 100 may be exhausted and, as such, discharge of the entire system of the fuel cell vehicle may occur.

To this end, during temperature increase control for the high-voltage battery 100, it is necessary to periodically check whether or not the current charge amount of the high-voltage battery 100 reaches a required charge amount and whether or not the operating voltage of the high-voltage battery 100 reaches an expected voltage of the fuel cell 200.

When the current charge amount of the high-voltage battery 100 reaches the required charge amount, and the operating voltage of the high-voltage battery 100 reaches the expected voltage of the fuel cell 200, this state corresponds to a state in which there is no possibility of overlap of the operating voltages of the high-voltage battery 100 and the fuel cell 200. In this case, accordingly, it is unnecessary to further perform temperature increase control for the high-voltage battery 100.

That is, the controller 300 according to the exemplary embodiment of the present disclosure may prevent unnecessary power consumption of the high-voltage battery 100 and preventing a possibility of discharge of the entire system of the fuel cell vehicle by periodically driving a "heat capacity required for temperature increase of the high-voltage battery 100" with reference to a current state of the high-voltage battery 100, and then comparing the periodically derived heat capacity required for temperature increase of the high-voltage battery 100 with an available power amount according to a charge amount of the high-voltage battery 100, thereby determining whether or not there is a possibility of temperature control for the high-voltage battery 100.

Next, the case in which "temperature increase control for the fuel cell 200 to lower the operating voltage of the fuel cell 200" is performed will be described.

The controller 300 of the startability improving system of the fuel cell vehicle according to the exemplary embodiment of the present disclosure may determine whether or not there is a temperature control possibility for the high-voltage battery 100, based on the charge amount of the high-voltage battery 100, and may then perform temperature increase control for the fuel cell 200 in order to lower the operating voltage of the fuel cell 200, upon determining that temperature control for the high-voltage battery 100 is impossible.

That is, it may be understood that, in the exemplary embodiment of the present disclosure, the temperature increase control for the fuel cell 200 is performed when it is impossible to raise the operating voltage of the high-voltage battery 100 due to impossibility of temperature increase control for the high-voltage battery 100.

In other words, in place of raising the operating voltage of the high-voltage battery 100, lowering of the operating voltage of the fuel cell 200 is performed such that the operating voltage of the fuel cell 200 escapes a low current range such as the region D of FIG. 3 and, as such, it may be possible to prevent a situation in which the operating voltages of the high-voltage battery 100 and the fuel cell 200 overlap each other, even when temperature increase control for the high-voltage battery 100 is impossible.

In detail, the startability improving system of the fuel cell vehicle according to the exemplary embodiment of the present disclosure may further include a fuel cell main relay 210 provided between the main bus stage 10 and the fuel cell 200 and configured to connect or disconnect the fuel cell 200 to or from the main bus stage 10, and a cathode oxygen depletion (COD) heater 220 provided between the fuel cell main relay 210 and the fuel cell 200 and configured to remove residual oxygen and hydrogen in the interior of the fuel cell 200. In this case, the controller 300 may perform temperature increase control for the fuel cell 200 by driving the COD heater 220 through the fuel cell 200 in a state of disconnecting the fuel cell 200 from the main bus stage 10.

As shown in FIG. 1, generally, fuel cell vehicles include the COD heater 220 in order to enhance electricity generation efficiency of the fuel cell 200 and to reduce a cold start time.

The COD heater 220 means a device configured to rapidly heat cooling water upon driving of a fuel cell vehicle in winter, thereby enhancing efficiency of the fuel cell 200. The COD heater 220 consumes residual oxygen and hydrogen in the interior of the fuel cell 200 before start of the fuel cell vehicle, thereby enhancing durability of the fuel cell 200. In addition, the COD heater 220 increases the temperature of the fuel cell 200 to a normal operation temperature, thereby reducing a cold start time. Accordingly, there is an advantage of an enhancement in vehicle marketability.

Meanwhile, temperature increase control for the fuel cell 200 according to the exemplary embodiment of the present disclosure is performed when temperature increase control for the high-voltage battery 100 is impossible. For this reason, it is impossible to drive the COD heater 220 through discharge of the high-voltage battery 100.

To this end, in the startability improving system of the fuel cell vehicle according to the exemplary embodiment of the present disclosure, the COD heater 220 is driven through electricity generation of the fuel cell 200. That is, hydrogen, which is fuel, and oxygen, which is a reactant, are supplied to the fuel cell 200, for electricity generation of the fuel cell 200. In accordance with driving of the COD heater 220, residual oxygen and hydrogen in the interior of the fuel cell 200 are removed. At the same time, residual moisture or frozen ice present in the interior of the fuel cell 200, which interfere with a flow of air supplied to the fuel cell 200, may be evaporated or melted and, as such, the output of the fuel cell 200 may be recovered. As a result, the operating voltage of the fuel cell 200 may escape the low current range such as the region D of FIG. 3.

In this case, the controller 300 may control the fuel cell main relay 210 such that the COD heater 220 can be driven in a state in which the fuel cell 200 is disconnected from the main bus stage 10. When the fuel cell main relay 210 is connected in a situation in which the operating voltage of the fuel cell 200 is high, current is generated due to a potential difference and, as such, the output of the fuel cell 200 is recovered. Thus, a connection time of the fuel cell main relay 210 is controlled until the operating voltage of the fuel cell 200 is lowered.

That is, the controller 300 of the startability improving system of the fuel cell vehicle according to the exemplary embodiment of the present disclosure may control the fuel cell main relay 210 to connect the fuel cell 200 to the main bus stage 10 when the operating voltage of the fuel cell 200 is lowered below a predetermined reference value through temperature increase control for the fuel cell 200.

Here, it may be understood that the "predetermined reference value" means a reference voltage having a level representing a determination that the output of the fuel cell 200 has been recovered. The reference voltage as described above is an experimental value derived through a plurality of experiments, and may be stored in the memory (not shown) internally included in the controller 300.

For reference, the reference value may be set to a value lower than the operating voltage of the high-voltage battery 100, and may be determined taking into consideration a buffer voltage for normal operation of a converter (not shown). Here, it may be understood that the converter (not shown) means a device configured to vary the electricity generation voltage of the fuel cell 200 in accordance with a voltage required by the load 400 of the vehicle in a procedure in which the electricity generation voltage of the fuel cell 200 is transferred to the load 400 of the vehicle 400.

As a result, the operating voltage of the fuel cell 200 is lowered and, as such, escapes the region D of FIG. 3. Accordingly, there is an advantage in that it may be possible to more effectively prevent a situation in which the operating voltages of the high-voltage battery 100 and the fuel cell 200 overlap each other upon start of the fuel cell vehicle.

FIG. 4 is a flowchart of a control method of a startability improving system of a fuel cell vehicle according to an exemplary embodiment of the present disclosure.

Referring to FIG. 4, the control method of the startability improving system of the fuel cell vehicle according to the exemplary embodiment of the present disclosure includes determining, by a controller, whether or not there is a possibility of overlap of operating voltages of a high-voltage battery and a fuel cell when the high-voltage battery and the fuel cell are connected to a main bus stage (S100), varying, by the controller, the operating voltage of the high-voltage battery or the fuel cell when overlap of the operating voltages of the high-voltage battery and the fuel cell is expected (S200, S300, S400, S500 and S600), and connecting, by the controller, the high-voltage battery and the fuel cell to the main bus stage (S700 and S800).

In detail, in the determining whether or not there is a possibility of overlap of operating voltages of a high-voltage battery and a fuel cell in the control method of the startability improving system of the fuel cell vehicle according to an exemplary embodiment of the present disclosure, a controller 300 may compare an output voltage of a fuel cell 200 upon start of the vehicle with an expected voltage of the fuel cell 200 derived based on a previously-prepared first data map, and may compare a charge amount of a high-voltage battery 100 upon start of the vehicle with a required charge amount of the high-voltage battery 100 derived based on a previously-prepared second data map, thereby determining whether or not there is a possibility of overlap of operating voltages of the high-voltage battery 100 and the fuel cell 200. The first data map may use a temperature of the fuel cell 200 as an input thereof and the expected voltage of the fuel cell 200 as an output thereof, whereas the second data map may use a temperature of the high-voltage battery 100 as an input thereof and the required charge amount of the high-voltage battery 100 as an output thereof.

In addition, in the varying the operating voltage of the high-voltage battery or the fuel cell when overlap of the operating voltages of the high-voltage battery and the fuel cell is expected (S200, S300, S400, S500 and S600) in the control method of the startability improving system of the fuel cell vehicle according to an exemplary embodiment of the present disclosure, the controller 300 may control the temperature of the high-voltage battery 100 or the fuel cell 200 when overlap of the operating voltages of the high-voltage battery 100 and the fuel cell 200 is expected, thereby varying the operating voltage of the high-voltage battery 100 or the fuel cell 200.

In addition, in the connecting the high-voltage battery and the fuel cell to a main bus stage (S700 and S800) in the control method of the startability improving system of the fuel cell vehicle according to an exemplary embodiment of the present disclosure, the controller 300 may connect the high-voltage battery 100 and the fuel cell 200 to a main bus stage 10 when overlap of the operating voltages of the high-voltage battery 100 and the fuel cell 200 is not expected.

Here, it may be understood that the case in which "overlap of the operating voltages of the high-voltage battery 100 and the fuel cell 200 is not expected" includes both the case in which, in the determining whether or not there is a possibility of overlap of operating voltages of a high-voltage battery and a fuel cell (S100), it is determined that overlap of the operating voltages of the high-voltage battery and the fuel cell is not expected (S800) and the case in which, in the varying the operating voltage of the high-voltage battery or the fuel cell (S200, S300, S400, S500 and S600), the operating voltage of the high-voltage battery or the fuel cell is varied through control of a temperature of the high-voltage battery and the fuel cell, thereby avoiding overlap of the operating voltages of the high-voltage battery and the fuel cell (S700).

A concrete control method and principles of actions by the controller 300 in each step of the method of controlling the charge amount of the high-voltage battery 100 in the fuel cell vehicle according to the exemplary embodiment of the present disclosure are identical those described with reference to the control system in the startability improving system of the fuel cell vehicle according to the exemplary embodiment of the present disclosure and, as such, a repeated description thereof will be omitted.

Thus, in accordance with the startability improving system of the fuel cell vehicle and the control method thereof according to the exemplary embodiments of the present disclosure as described above, it may be possible to previously determine whether or not there is a possibility of overlap of operating voltages of the high-voltage battery 100 and the fuel cell 200, based on an output voltage of the fuel cell 200 or a charge amount of the high-voltage battery 100 upon start of the fuel cell vehicle, and to avoid a situation in which the operating voltages of the fuel cell 200 and the high-voltage battery 100 overlap each other, through temperature increase control for the high-voltage battery 100 or the fuel cell 200, when overlap of the operating voltages of the high-voltage battery 100 and the fuel cell 200 is expected. Accordingly, there is an advantage in that it may be possible to solve problems of weight increase and cost increase caused by an increase in capacity of the high-voltage battery 100 in implementation of conventional avoidance control.

It may be possible to fundamentally eliminate a voltage reversal phenomenon by preventing a situation in which operating voltages of the high-voltage battery 100 and the fuel cell 200 overlap each other, through an avoidance control as described above. Accordingly, there is an effect of enhancing durability of the fuel cell 200 while improving startability of the fuel cell vehicle.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A startability improving system of a fuel cell vehicle comprising:
  a high-voltage battery and a fuel cell connected to a main bus stage of the fuel cell vehicle, to provide driving energy; and
  a controller configured to determine whether there is a possibility that operating voltages of the high-voltage battery and the fuel cell overlap each other when the high-voltage battery and the fuel cell are connected to the main bus stage, in response to determination that there is a possibility that the operating voltages of the high-voltage battery and the fuel cell overlap each other, the controller configured to vary the operating voltage of the high-voltage battery or the fuel cell, and then to connect the high-voltage battery and the fuel cell to the main bus stage.

2. The startability improving system according to claim 1, wherein:
  the controller compares an output voltage of the high-voltage battery upon start of the vehicle with an expected voltage of the fuel cell derived based on a previously-prepared first data map, thereby determining whether there is a possibility that the operating voltages of the high-voltage battery and the fuel cell overlap each other, the first data map includes a temperature of the fuel cell as an input thereof and the expected voltage as an output thereof.

3. The startability improving system according to claim 1, wherein:

the controller compares a charge amount of the high-voltage battery upon start of the vehicle with a required charge amount of the high-voltage battery derived based on a prepared second data map, thereby determining whether there is a possibility that the operating voltages of the high-voltage battery and the fuel cell overlap each other, the second data map includes a temperature of the high-voltage battery as an input thereof and the required charge amount as an output thereof.

4. The startability improving system according to claim 1, wherein in response to determination that there is a possibility that the operating voltages of the high-voltage battery and the fuel cell overlap each other, the controller controls a temperature of the high-voltage battery or the fuel cell to vary the operating voltage of the high-voltage battery or the fuel cell.

5. The startability improving system according to claim 4, wherein the controller determines whether temperature control for the high-voltage battery is possible, based on a charge amount of the high-voltage battery, and in response to determination that the temperature control for the high-voltage battery is possible, the controller performs temperature increase control for the high-voltage battery to raise the operating voltage of the high-voltage battery.

6. The startability improving system according to claim 5, further comprising:

a heater for the high-voltage battery configured to increase a temperature of the high-voltage battery using cooling water, wherein the controller drives the heater for the high-voltage battery through the high-voltage battery, to perform the temperature increase control for the high-voltage battery.

7. The startability improving system according to claim 5, wherein the controller determines whether the temperature control for the high-voltage battery is possible based on an available electric power amount according to the charge amount of the high-voltage battery and a heat capacity required for temperature increase of the high-voltage battery.

8. The startability improving system according to claim 7, wherein the controller derives the heat capacity required for temperature increase of the high-voltage battery, based on the following Expression:

Heat Capacity Required for Temperature Increase of High-Voltage Battery=(Target Heat Capacity of High-Voltage Battery−Current Heat Capacity of High-Voltage Battery)/Temperature Increase Efficiency of High-Voltage Battery. [Expression]

9. The startability improving system according to claim 7, wherein the controller periodically derives the heat capacity required for temperature increase of the high-voltage battery during the temperature increase control for the high-voltage battery, and compares the periodically-derived heat capacity required for temperature increase of the high-voltage battery with the available electric power amount according to the charge amount of the high-voltage battery, thereby determining whether the temperature control for the high-voltage battery is possible.

10. The startability improving system according to claim 4, wherein the controller determines whether temperature control for the high-voltage battery is possible, based on a charge amount of the high-voltage battery, and in response to determination that the temperature control for the high-voltage battery is possible, the controller performs temperature increase control for the fuel cell upon to lower the operating voltage of the fuel cell.

11. The startability improving system according to claim 10, further comprising:

a fuel cell main relay, provided between the main bus stage of the vehicle and the fuel cell, configured to connect or disconnect the fuel cell and the main bus stage; and a cathode oxygen depletion (COD) heater, provided between the fuel cell main relay and the fuel cell, configured to remove residual oxygen and hydrogen in an interior of the fuel cell, wherein the controller drives the COD heater through the fuel cell in a state of disconnecting the fuel cell and the main bus stage by controlling the fuel cell main relay, thereby performing the temperature increase control for the fuel cell.

12. The startability improving system according to claim 11, wherein the controller controls the fuel cell main relay to connect the fuel cell to the main bus stage when the operating voltage of the fuel cell is lowered below a predetermined reference value through the temperature increase control for the fuel cell.

13. A control method of a startability improving system of a fuel cell vehicle comprising a high-voltage battery, a fuel cell and a controller, the method comprising:

determining, by the controller, whether there is a possibility that operating voltages of the high-voltage battery and the fuel cell overlap when the high-voltage battery and the fuel cell are connected to a main bus stage of the fuel cell vehicle;

in response to determination that there is a possibility that the operating voltages of the high-voltage battery and the fuel cell overlap, varying, by the controller, the operating voltage of the high-voltage battery or the fuel cell; and connecting, by the controller, the high-voltage battery and the fuel cell to the main bus stage.

14. The method according to claim 13, wherein:

the determining comprising:

comparing, by the controller, an output voltage of the fuel cell upon start of the vehicle with an expected voltage of the fuel cell derived based on a previously-prepared first data map; and comparing, by the controller, a charge amount of the high-voltage battery upon start of the vehicle with a required charge amount of the high-voltage battery derived based on a previously-prepared second data map to determine the possibility, wherein the first data map includes a temperature of the fuel cell as an input thereof and the expected voltage of the fuel cell as an output thereof, and the second data map includes a temperature of the high-voltage battery as an input thereof and the required charge amount of the high-voltage battery as an output thereof.

15. The method according to claim 13, wherein the varying comprising:

controlling, by the controller, a temperature of the high-voltage battery or the fuel cell.

16. The method according to claim 13, comprising:
in response to determination that there is no possibility that the operating voltages of the high-voltage battery and the fuel cell overlap,
connecting, by the controller, the high-voltage battery and the fuel cell to the main bus stage without varying the operating voltage of the high-voltage battery or fuel cell.

* * * * *